(12) United States Patent
Singh et al.

(10) Patent No.: US 7,413,674 B2
(45) Date of Patent: Aug. 19, 2008

(54) AZEOTROPE-LIKE TRIFLUOROIODOMETHANE COMPOSITIONS

(75) Inventors: Rajiv R. Singh, Getzville, NY (US); David P. Wilson, East Amherst, NY (US); Hang T. Pham, Amherst, NY (US)

(73) Assignee: Honeywell International Inc., Morristown, NJ (US)

( * ) Notice: Subject to any disclaimer, the term of this patent is extended or adjusted under 35 U.S.C. 154(b) by 542 days.

(21) Appl. No.: 10/826,811

(22) Filed: Apr. 16, 2004

(65) Prior Publication Data

US 2005/0233923 A1 Oct. 20, 2005

(51) Int. Cl.
*C11D 17/00* (2006.01)

(52) U.S. Cl. .................... 252/67; 252/2; 252/8

(58) Field of Classification Search ............ 252/2, 252/8, 67
See application file for complete search history.

(56) References Cited

U.S. PATENT DOCUMENTS

| 5,182,040 | A | 1/1993 | Bartlett et al. ............ 252/67 |
| 5,380,449 | A | 1/1995 | Thomas et al. ............ 252/68 |
| 5,611,210 | A | 3/1997 | Nimitz et al. ............ 62/114 |
| 5,648,017 | A | 7/1997 | Bartlett et al. ............ 252/67 |
| 5,716,549 | A | 2/1998 | Nimitz et al. ............ 252/364 |
| 6,270,689 | B1 * | 8/2001 | Nimitz ............ 252/67 |
| 7,083,742 | B1 * | 8/2006 | Nimitz et al. ............ 252/8 |
| 2005/0145820 | A1 * | 7/2005 | Waldrop et al. ............ 252/3 |
| 2006/0202154 | A1 * | 9/2006 | Flohr et al. ............ 252/67 |
| 2007/0040147 | A1 * | 2/2007 | Brown et al. ............ 252/67 |

FOREIGN PATENT DOCUMENTS

| JP | 09059612 A | * | 3/1997 |
| JP | 11199863 A | * | 7/1999 |

* cited by examiner

*Primary Examiner*—Gregory E Webb
(74) *Attorney, Agent, or Firm*—Colleen D. Szuch

(57) ABSTRACT

Provided are azeotrope-like compositions comprising difluoroethane and trifluoroiodomethane, azeotrope-like compositions comprising difluoroethane, tetrafluoropropene and trifluoroiodomethane, and uses thereof, including use in refrigerant compositions, refrigeration systems, blowing agent compositions, and aerosol propellants.

21 Claims, No Drawings

AZEOTROPE-LIKE TRIFLUOROIODOMETHANE COMPOSITIONS

CROSS-REFERENCES TO RELATED APPLICATIONS

This application claims the benefit of priority to the U.S. applications identified by respectively, all of which were filed on even date herewith and are incorporated herein by reference.

FIELD OF INVENTION

The present invention relates generally to azeotrope-like compositions comprising trifluoroiodomethane, and uses thereof. More specifically, the present invention provides binary azeotrope-like compositions of 1,1-difluoroethane and trifluoroiodomethane, ternary azeotrope-like compositions of 1,1-difluoroethane, trans-1,1,1,3-tetrafluoropropene and trifluoroiodomethane, and uses thereof.

BACKGROUND

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, including the relatively high global warming potentials associated therewith, it is desirable to use fluids having low or even zero ozone depletion potential, such as hydrofluorocarbons ("HFCs"). Thus, the use of fluids that do not contain chlorofluorocarbons ("CFCs") or hydrochlorofluorocarbons ("HCFCs") is desirable. Additionally, the use of single component fluids or azeotropic mixtures, which do not fractionate on boiling and evaporation, is desirable. However, the identification of new, environmentally-safe, non-fractionating mixtures is complicated due to the fact that azeotrope formation is not readily predictable.

The industry is continually seeking new fluorocarbon based mixtures that offer alternatives, and are considered environmentally safer substitutes for CFCs and HCFCs. Of particular interest are mixtures containing both hydrofluorocarbons and other fluorinated compounds, both of low ozone depletion potentials. Such mixtures are the subject of this invention.

DESCRIPTION OF PREFERRED EMBODIMENTS

The present inventors have developed several compositions comprising trifluoroiodomethane that help to satisfy the continuing need for alternatives to CFCs and HCFCs. According to certain embodiments, the present invention provides azeotrope-like compositions comprising 1,1-difluoroethane ("HFC-152a"), and trifluoroiodomethane ("CF$_3$I"). According to certain other embodiments, the present invention provides azeotrope-like compositions comprising 1,1-difluoroethane ("HFC-152a"), trans-1,1,1,3-tetrafluoropropene ("HFO-1234") and trifluoroiodomethane ("CF$_3$I").

The preferred compositions of the invention tend to exhibit characteristics which make them particularly desirable for use in a number of applications, including as refrigerants in automotive heat pump, and auto HVAC systems. In particular, applicants have recognized that the present compositions tend to exhibit relatively low global warming potentials ("GWPs") and tend to have a higher refrigeration capacity than many conventional HFC refrigerants, for example, HFC-134a. Accordingly, the present compositions are suitable for use to great advantage as replacements for CFCs, HCFCs, and HFCs (such as HFC-134a) in refrigerant, aerosol, and other applications.

Additionally, applicants have recognized surprisingly that azeotrope-like compositions of HFC-152a and CF$_3$I, and azeotrope-like compositions of HFC-152a, HFO-1234 and CF$_3$I can be formed. Accordingly, in certain embodiments, the present invention provides methods of producing an azeotrope-like composition comprising combining HFC-152a and CF$_3$I in amounts effective to produce and azeotrope-like composition, and in other embodiments, methods of producing an azeotrope-like composition comprising combining HFC-152a, HFO-1234 and CF$_3$I in amounts effective to produce an azeotrope-like composition.

In addition, applicants have recognized that the azeotrope-like compositions of the present invention exhibits properties that make them advantageous for use as, or in, refrigerant compositions. Accordingly, in yet other embodiments, the present invention provides refrigerant compositions comprising an azeotrope-like composition of HFC-152a and CF$_3$I and, in yet other embodiments, refrigerant compositions comprising an azeotrope-like composition of HFC-152a, HFO-1234 and CF$_3$I.

Azeotrope-like Compositions

As used herein, the term "azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant-boiling and cannot be separated during a phase change.

The azeotrope-like compositions of the invention may include additional components that do not form new azeotrope-like systems, or additional components that are not in the first distillation cut. The first distillation cut is the first cut taken after the distillation column displays steady state operation under total reflux conditions. One way to determine whether the addition of a component forms a new azeotrope-like system so as to be outside of this invention is to distill a sample of the composition with the component under conditions that would be expected to separate a non-azeotropic mixture into its separate components. If the mixture containing the additional component is non-azeotrope-like, the additional component will fractionate from the azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

It is well-recognized in the art that it is not possible to predict the formation of azeotropes. (See, for example, U.S. Pat. No. 5,648,017 (column 3, lines 64-65) and U.S. Pat. No. 5,182,040 (column 3, lines 62-63), both of which are incorporated herein by reference). Applicants have discovered unexpectedly that HFC-152a, HFO-1234 and $CF_3I$ from azeotrope-like compositions.

HFC-152a and $CF_3I$ Compositions

According to certain preferred embodiments, the azeotrope-like compositions of the present invention comprise, and preferably consist essentially of, effective azeotrope-like amounts of HFC-152a and $CF_3I$. The term "effective azeotrope-like amounts" as used herein refers to the amount of each component which upon combination with the other components, results in the formation of an azeotrope-like composition of the present invention. Preferably, the present azeotrope-like compositions comprise, and preferably consist essentially of, from about 35 to about 55 weight percent of HFC-152a and from about 45 to about 65 weight percent of $CF_3I$, and even more preferably, from 35 to about 43 weight percent of HFC-152a and from about 57 to about 65 weight percent of $CF_3I$. Unless otherwise indicated, the weight percents disclosed herein are based on the total weight of HFC-152a and $CF_3I$ in a composition.

The azeotrope-like compositions described herein preferably have a boiling point of from about −23° C. to about −28° C. at a pressure of about 14.42 psia. In certain more preferred embodiments, the present azeotrope-like compositions have a boiling point of from about −24° C. to about −28° C. at a pressure of about 14.42 psia, in even more preferred embodiments, from about −25° C. to about −28° C. at a pressure of about 14.42 psia, and in even more preferred embodiments, from about −26° C. to about −27.5° C. at a pressure of about 14.42 psia.

The azeotrope-like compositions of the present invention can be produced by combining effective azeotrope-like amounts of HFC-152a and $CF_3I$. Any of a wide variety of methods known in the art for combining two or more components can be adapted for use in the present methods to produce an azeotrope-like composition. For example, HFC-152a and $CF_3I$ can be mixed, blended, or otherwise contacted by hand and/or by machine, as part of a batch or continuous reaction and/or process, or via combinations of two or more such steps. In light of the disclosure herein, those of skill in the art will be readily able to prepare azeotrope-like compositions according to the present invention without undue experimentation.

HFC-152a HFO-1234 and $CF_3I$ Compositions

According to certain preferred embodiments, the azeotrope-like compositions of the present invention comprise, and preferably consist essentially of, effective azeotrope-like amounts of HFC-152a, HFO-1234 and $CF_3I$. Preferably, the present azeotrope-like compositions comprise, and preferably consist essentially of, from about 10 to about 95 weight percent of HFC-152a, from about 1 to about 70 weight percent of $CF_3I$, and from greater than zero to about 70 weight percent of HFO-1234. More preferably, the present azeotrope-like compositions comprise, and preferably consist essentially of, from about 20 to about 95 weight percent of HFC-152a, from about 1 to about 65 weight percent of $CF_3I$, and from greater than zero to about 65 weight percent of HFO-1234. Certain even more preferred compositions comprise: from about 20 to about 95 weight percent of HFC-152a, from about 1 to about 65 weight percent of $CF_3I$, and from greater than 0 to about 25 weight percent of HFO-1234; and from about 20 to about 40 weight percent of HFC-152a, from about 35 to about 65 weight percent of $CF_3I$, and from greater than 0 to about 15 weight percent of HFO-1234. Unless otherwise indicated, the weight percents disclosed herein are based on the total weight of HFC-152a, $CF_3I$, and HFO-1234 in a composition.

The azeotrope-like compositions described herein preferably have a boiling point of from about −23° C. to about −28° C. at a pressure of about 14.42 psia. In certain more preferred embodiments, the present azeotrope-like compositions have a boiling point of from about −24° C. to about −27° C. at a pressure of about 14.42 psia, and in even more preferred embodiments, from about −24.5° C. to about −26.7° C. at a pressure of about 14.42 psia.

The azeotrope-like compositions of the present invention can be produced by combining effective azeotrope-like amounts of HFC-152a, HFO-1234 and $CF_3I$. Any of a wide variety of methods known in the art for combining three or more components to form a composition can be adapted for use in the present methods to produce an azeotrope-like composition. For example, HFC-152a, HFO-1234 and $CF_3I$ can be mixed, blended, or otherwise contacted by hand and/or by machine, as part of a batch or continuous reaction and/or process, or via combinations of two or more such steps. In light of the disclosure herein, those of skill in the art will be readily able to prepare azeotrope-like compositions according to the present invention without undue experimentation.

Composition Additives

The binary and ternary azeotrope-like compositions of the present invention may further include any of a variety of optional additives including stabilizers, metal passivators, corrosion inhibitors, and the like.

According to certain embodiments, the azeotrope-like compositions of the present invention further comprise a stabilizer. Any of a variety of compounds suitable for stabilizing an azeotrope-like composition of the present invention may be used. Examples of certain preferred stabilizers include stabilizer compositions comprising at least one phenol composition and at least one epoxide selected from the group consisting of aromatic epoxides, alkyl epoxides, alkenyl epoxides, and combinations of two or more thereof.

Any of a variety of phenol compounds are suitable for use in the present compositions. While applicants do not wish to be bound by or to any theory of operation, it is believed that the present phenols act as radical scavengers in the $CF_3I$ compositions and thereby tend to increase the stability of such compositions. As used herein the term "phenol compound" refers generally to any substituted or unsubstituted phenol. Examples of suitable phenol compounds include phenols comprising one or more substituted or unsubstituted cyclic, straight-chain, or branched aliphatic substituent group, such as, alkylated monophenols including: 2,6-di-tert-butyl-4-methylphenol; 2,6-di-tert-butyl-4-ethylphenol; 2,4-dimethyl-6-tert-butylphenol; tocopherol; and the like, hydroquinone and alkylated hydroquinones including: t-butyl hydroquinone; other derivatives of hydroquinone; and the like, hydroxylated thiodiphenyl ethers including: 4,4'-thiobis (2-methyl-6-tert-butylphenol); 4,4'-thiobis(3-methyl-6-tert-butylphenol); 2,2'-thiobis(4-methyl-6-tert-butylphenol); and the like, alkylidene-bisphenols including: 4,4'-methylenebis (2,6-di-tert-butylphenol); 4,4'-bis(2,6-di-tert-butylphenol; derivatives of 2,2- or 4,4-biphenyldiols; 2,2'-methylenebis(4-ethyl-6-tertbutylphenol); 2,2'-methylenebis(4-methyl-6-tert-butylphenol); 4,4,-butylidenebis(3-methyl-6-tert-butylphenol); 4,4,-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol), 2,2- or 4,4-biphenyldiols including 2,2'-methylenebis(4-ethyl-6-tertbutylphenol), butylated hydroxy toluene (BHT), bisphenols comprising heteroatoms including: 2,6-di-tert-.alpha.-dimethylamino-p-cresol; 4,4-thiobis(6-tert-butyl-m-cresol); and the like; acylaminophenols; 2,6-di-tert-butyl-4(N,N'-dimethylaminomethylphenol); sulfides including: bis(3-methyl-4-hydroxy-5-tert-butylbenzyl)sulfide; bis(3,5-di-tert-butyl-4-hydroxybenzyl)sulfide; and the like; as well as, phenolic UV absorb and light stabilizers. Certain preferred phenols include alkylated monophenols such as tocopherol, BHT, hydroquinones, and the like. Certain particularly preferred phenols include tocopherol, and the like. Most phenols are commercially available. A single phenol compound and/or mixtures of two or more phenols may be used in the present compositions. Any of a variety of epoxides are suitable for use in the compositions of the present invention. While applicants do not wish to be bound by or to any theory of operation, it is believed that the epoxides of the present invention act as acid scavengers in the $CF_3I$ compositions and thereby tend to increase the stability of such compositions. A single aromatic epoxide and/or mixtures of two or more aromatic epoxides may be used in the present compositions.

Examples of suitable aromatic epoxides include those defined by the formula I below:

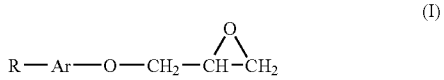
(I)

wherein: R is hydrogen, hydroxyl, alkyl, fluoroalkyl, aryl, fluoroaryl, or

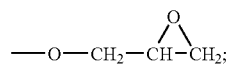

and Ar is a substituted or unsubstituted phenylene or napthylene moiety. Certain preferred aromatic epoxides of Formula I include those wherein Ar is phenylene or phenylene substituted with one or more substituents including alkyls, alkenyls, alkynyls, aryls, alkylaryls, halogens, halogenated alkyls, halogenated alkenyls, halogenated alkynyls, halogenated aryls, halogenated arylalkyls, hydroxyls, heteroatom moieties, and the like. Examples of suitable compounds of Formula I wherein Ar is an unsubstituted or substituted phenylene include butylphenylglycidyl ether; pentylphenylglycidyl ether; hexylphenylglycidyl ether; heptylphenylglycidyl ether; octylphenylglycidyl ether; nonylphenylglycidyl ether; decylphenylglycidyl ether; glycidyl methyl phenyl ether; 1,4-diglycidyl phenyl diether; 4-methoxyphenyl glycidyl ether; derivatives thereof; and the like.

Certain other preferred aromatic epoxides of Formula I include those wherein Ar is napthylene or napthylene substituted with one or more substituents including alkyls, alkenyls, alkynyls, aryls, alkylaryls, halogens, halogenated alkyls, halogenated alkenyls, halogenated alkynyls, halogenated aryls, halogenated arylalkyls, hydroxyls, heteroatom moieties, and the like. Examples of suitable compounds of Formula I wherein Ar is an unsubstituted or substituted napthylene include naphthyl glycidyl ether; 1,4-diglycidyl naphthyl diether; derivatives thereof; and the like.

Examples of other suitable aromatic epoxides include bisoxiranes, such as, 2,2'[[[5-heptadecafluorooctyl]1,3phenylene]bis[[2,2,2trifluoromethyl]ethylidene]oxymethylene] bisoxirane; and the like.

In certain preferred embodiments, the aromatic epoxides for use in the present invention comprise an epoxide of Formula I wherein Ar is phenylene, substituted phenylene, napthylene, or substituted napthylene. More preferably, the aromatic epoxides comprise an epoxide of Formula I wherein Ar is phenylene or substituted phenylene. Examples of certain more preferred aromatic epoxides include butylphenyl glycidyl ether, and the like.

Any of a variety of alkyl and/or alkenyl epoxides are suitable for use in the present compositions. Examples of suitable alkyl and alkenyl epoxides include those of Formula II:

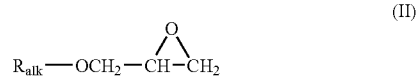
(II)

wherein $R_{alk}$ is a substituted or unsubstituted alkyl or alkenyl group. Certain preferred epoxides of Formula II comprise alkyl epoxide compounds wherein $R_{alk}$ is an alkyl group having from about 1 to about 10 carbon atoms, more preferably from about 1 to about 6 carbon atoms, and wherein the alkyl may be unsubstituted or further substituted with one or more substituents including alkyls, alkenyls, alkynyls, aryls, alkylaryls, halogens, halogenated alkyls, halogenated alkenyls, halogenated alkynyls, halogenated aryls, halogenated arylalkyls, hydroxyls, heteroatom moieties, and the like. Examples of such preferred alkyl epoxides of Formula II include n-butyl glycidyl ether, isobutyl glycidyl ether, hexanediol diglycidyl ether, and the like, as well as, fluorinated and perfluorinated alkyl epoxides, and the like. Certain more preferred alkyl epoxides comprise hexanediol diglycidyl ether, and the like.

Certain other preferred epoxides of Formula II comprise alkenyl epoxide compounds wherein $R_{alk}$ is an alkenyl group having from about 1 to about 10 carbon atoms, more preferably from about 1 to about 6 carbon atoms, and wherein the alkenyl may be unsubstituted or further substituted with one or more substituents including alkyls, alkenyls, alkynyls, aryls, alkylaryls, halogens, halogenated alkyls, halogenated alkenyls, halogenated alkynyls, halogenated aryls, halogenated arylalkyls, hydroxyls, heteroatom moieties, and the like. Examples of such preferred alkenyl epoxides of Formula II include allyl glycidyl ether, fluorinated and perfluorinated alkenyl epoxides, and the like. More preferred alkenyl epoxides include allyl glycidyl ether, and the like. A single alkyl epoxide or alkenyl epoxide and/or combinations of two or more thereof may be used in the present compositions.

In certain other preferred embodiments, the alkyl epoxide for use as an acid scavenger in the present composition comprises polypropylene glycol diglycidyl ether. Examples of polypropylene glycol diglycidyl ether suitable for use in the present invention includes the ether available commercially from SACHEM, Europe.

In addition, in certain embodiments, the epoxide for use in the present invention comprises combinations of two or more aromatic, alkyl, and/or alkenyl substituents. Such epoxides are referred to generally as "multisubstituted epoxides."

According to certain preferred embodiments, the stabilizer for use in the present invention comprises a combination of at least one phenol compound and at least one aromatic, alkyl, or alkenyl epoxide. Examples of suitable combinations include stabilizers comprising: tocopherol and allyl glycidyl ether, BHT and glycidyl butyl ether, and the like. Certain particularly preferred combinations include stabilizers comprising: tocopherol and allyl glycidyl ether, and the like.

Any suitable relative amount of the at least one phenol compound and the at least one aromatic, alkyl, or alkenyl epoxide may be used in the preferred stabilizers. For example, the weight ratio of phenol compound(s) to aromatic or fluorinated alkyl epoxide(s) can be varied from about 1:99 to about 99:1. In certain preferred embodiments, the weight ratios of phenol compound(s) to aromatic, alkyl, alkenyl, multisubstituted, or fluorinated alkyl epoxide(s) is from about 30 to about 1, more preferably from about 7 to about 1, more preferably from about 2 to about 1, and even more preferably about 1:1.

Any suitable effective amount of stabilizer may be used in the trifluoroiodomethane compositions of the present invention. As used herein, the term "effective stabilizing amount" refers to an amount of stabilizer of the present invention which, when added to a composition comprising trifluoroiodomethane, results in a stabilized composition wherein the trifluoroiodomethane therein degrades more slowly and/or to a lesser degree relative to the original composition, under the same, or similar, conditions. In certain preferred embodiments, an "effective stabilizing amount" of stabilizer comprises an amount which, when added to a composition comprising trifluoroiodomethane, results in a stabilized composition wherein the trifluoroiodomethane therein degrades more slowly and/or to a lesser degree relative to the original composition under the conditions of at least one, or both, of the standards tests SAE J1662 (issued June 1993) and/or ASHRAE 97-1983R. In certain more preferred embodiments, an "effective stabilizing amount" of stabilizer comprises an amount which, when added to a composition comprising trifluoroiodomethane, results in a composition having a stability that is at least as good as, if not better, than the stability of a comparable composition comprising dichlorodifluoromethane (R-12) in mineral oil, under at least one of the standard tests SAE J1662 (issued June 1993) and/or ASHRAE 97-1983R. Certain preferred effective amounts of stabilizer for use in the present invention comprise from about 0.001 to about 10, more preferably from about 0.01 to about 5, even more preferably from about 0.3 to about 4 weight percent, and even more preferably from about 0.3 to about 1 weight percent based on the total weight of trifluoroiodomethane in the composition of the present invention.

In certain preferred embodiments, the compositions of the present invention further comprise a lubricant. Any of a variety of conventional lubricants may be used in the compositions of the present invention. An important requirement for the lubricant is that, when in use in a refrigerant system, there must be sufficient lubricant returning to the compressor of the system such that the compressor is lubricated. Thus, suitability of a lubricant for any given system is determined partly by the refrigerant/lubricant characteristics and partly by the characteristics of the system in which it is intended to be used. Examples of suitable lubricants include mineral oil, alkyl benzenes, polyol esters, including polyalkylene glycols, PAG oil, and the like. Mineral oil, which comprises paraffin oil or naphthenic oil, is commercially available. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate which is available as Emery 2917 (registered trademark) and Hatcol 2370 (registered trademark). Other useful esters include phosphate esters, dibasic acid esters, and fluoroesters. Preferred lubricants include polyalkylene glycols and esters. Certain more preferred lubricants include polyalkylene glycols.

Uses of the Compositions

The present compositions, including both the binary $CF_3I$/HFC-152a azetrope-like compositions and the ternary $CF_3I$/HFC-152a/HFO-1234 azeotrope-like compositions, have utility in a wide range of applications. For example, one embodiment of the present invention relates to refrigerant compositions comprising an azeotrope-like composition of the present invention.

The refrigerant compositions of the present invention may be used in any of a wide variety of refrigeration systems including air-conditioning, refrigeration, heat-pump, HVAC systems, and the like. In certain preferred embodiments, the compositions of the present invention are used in refrigeration systems originally designed for use with an HFC refrigerant, such as, for example, HFC-134a. The preferred compositions of the present invention tend to exhibit many of the desirable characteristics of HFC-134a and other HFC refrigerants, including a GWP that is as low, or lower than that of conventional HFC refrigerants and a capacity that is as high or higher than such refrigerants. In addition, the relatively constant boiling nature of the compositions of the present invention makes them even more desirable than certain conventional HFCs for use as refrigerants in many applications.

In certain other preferred embodiments, the present compositions are used in refrigeration systems originally designed for use with a CFC-refrigerant. Preferred refrigeration compositions of the present invention may be used in refrigeration systems containing a lubricant used conventionally with CFC-refrigerants, such as mineral oils, silicone oils, polyalkylene glycol oils, and the like, or may be used with other lubricants traditionally used with HFC refrigerants. As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers, transport refrigeration systems, commercial refrigeration systems and the like.

Any of a wide range of methods for introducing the present refrigerant compositions to a refrigeration system can be used in the present invention. For example, one method comprises attaching a refrigerant container to the low-pressure side of a refrigeration system and turning on the refrigeration system compressor to pull the refrigerant into the system. In such embodiments, the refrigerant container may be placed on a scale such that the amount of refrigerant composition entering the system can be monitored. When a desired amount of refrigerant composition has been introduced into the system, charging is stopped. Alternatively, a wide range of charging tools, known to those of skill in the art, is commercially available. Accordingly, in light of the above disclosure, those of skill in the art will be readily able to introduce the refrigerant compositions of the present invention into refrigeration systems according to the present invention without undue experimentation.

According to certain other embodiments, the present invention provides refrigeration systems comprising a refrigerant of the present invention and methods of producing heating or cooling by condensing and/or evaporating a composition of the present invention. In certain preferred embodiments, the methods for cooling an article according to the present invention comprise condensing a refrigerant composition comprising an azeotrope-like composition of the present invention and thereafter evaporating said refrigerant composition in the vicinity of the article to be cooled. Certain preferred methods for heating an article comprise condensing a refrigerant composition comprising an azeotrope-like composition of the present invention in the vicinity of the article to be heated and thereafter evaporating said refrigerant composition. In light of the disclosure herein, those of skill in the art will be readily able to heat and cool articles according to the present inventions without undue experimentation.

In another embodiment, the azeotrope-like compositions of this invention may be used as propellants in sprayable compositions, either alone or in combination with known propellants. The propellant composition comprises, more preferably consists essentially of, and, even more preferably, consists of the azeotrope-like compositions of the invention. The active ingredient to be sprayed together with inert ingredients, solvents, and other materials may also be present in the sprayable mixture. Preferably, the sprayable composition is an aerosol. Suitable active materials to be sprayed include, without limitation, cosmetic materials such as deodorants, perfumes, hair sprays, cleansers, and polishing agents as well as medicinal materials such as anti-asthma and anti-halitosis medications.

Yet another embodiment of the present invention relates to a blowing agent comprising one or more azeotrope-like compositions of the invention. In other embodiments, the invention provides foamable compositions, and preferably polyurethane and polyisocyanurate foam compositions, and methods of preparing foams. In such foam embodiments, one or more of the present azeotrope-like compositions are included as a blowing agent in a foamable composition, which composition preferably includes one or more additional components capable of reacting and foaming under the proper conditions to form a foam or cellular structure, as is well known in the art. Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention.

Other uses of the present azeotrope-like compositions include use as solvents, cleaning agents, and the like. Those of skill in the art will be readily able to adapt the present compositions for use in such applications without undue experimentation.

EXAMPLES

The invention is further illustrated in the following example which is intended to be illustrative, but not limiting in any manner.

Example 1

An ebulliometer consisting of vacuum jacketed tube with a condenser on top which is further equipped with a Quartz Thermometer K96S4771 is used. About 15 g HFC-152a and about 26 g of $CF_3I$ is charged to the ebulliometer and then HFO-1234 is added in small, measured increments. Temperature depression is observed when HFO-1234 is added to the HFC-152a/$CF_3I$ mixture, indicating a ternary minimum boiling azeotrope is formed. From greater than about 0 to about 14 weight percent HFO-1234, the boiling point of the composition changed by about 1° C. or less. The ternary mixtures shown in Table 1 were studied and the boiling point of the compositions changed by about 1° C. or less. The compositions exhibit azeotrope and/or azeotrope-like properties over this range.

TABLE 1

| HFC-152a/$CF_3I$/HFO-1234 compositions at 14.42 psia | | | |
|---|---|---|---|
| Wt. % HFC-152a | Wt. % $CF_3I$ | Wt. % HFO-1234 | Temperature (° C.) |
| 36.20 | 63.80 | 0.00 | −27.276 |
| 36.06 | 63.54 | 0.40 | −27.295 |
| 35.88 | 63.22 | 0.90 | −27.276 |
| 35.33 | 62.26 | 2.40 | −27.112 |
| 34.35 | 60.53 | 5.12 | −26.873 |
| 33.10 | 58.33 | 8.57 | −26.602 |
| 31.11 | 54.82 | 14.07 | −26.245 |

Example 2

An ebulliometer consisting of vacuum jacketed tube with a condenser on top which is further equipped with a Quartz Thermometer K96S4771 is used. About 36 g $CF_3I$ and about 26 g of HFO-1234 is charged to the ebulliometer and then HFC-152a is added in small, measured increments. Temperature depression is observed when HFC-152a is added to the HFO-1234/$CF_3I$ mixture, indicating a ternary minimum boiling azeotrope is formed. From greater than about 0 to about 29 weight percent HFC-152a, the boiling point of the composition changed by about 1° C. or less. The ternary mixtures shown in Table 2 were studied and the boiling point of the compositions changed by about 1° C. or less. The compositions exhibit azeotrope and/or azeotrope-like properties over this range.

TABLE 2

| HFC-152a/$CF_3I$/HFO-1234 compositions at 14.42 psia | | | |
|---|---|---|---|
| Wt. % HFC-152a | Wt. % $CF_3I$ | Wt. % HFO-1234 | Temperature (° C.) |
| 0.00 | 57.57 | 42.43 | −23.740 |
| 2.93 | 55.88 | 41.19 | −24.117 |
| 7.11 | 53.47 | 39.41 | −24.493 |
| 10.72 | 51.40 | 37.88 | −24.551 |
| 17.14 | 47.70 | 35.16 | −24.590 |
| 19.59 | 46.29 | 34.12 | −24.696 |
| 21.58 | 45.15 | 33.27 | −24.696 |
| 27.22 | 41.90 | 30.88 | −24.571 |
| 28.66 | 41.07 | 30.27 | −24.551 |

Example 3

An ebulliometer consisting of vacuum jacketed tube with a condenser on top which is further equipped with a Quartz Thermometer K96S4771 is used. About 17 g HFC-152a and about 7 g of HFO-1234 is charged to the ebulliometer and then $CF_3I$ is added in small, measured increments. Temperature depression is observed when $CF_3I$ is added to the HFC-152a/HFO-1234 mixture, indicating a ternary minimum boiling azeotrope is formed. From greater than about 0 to about 29 weight percent $CF_3I$, the boiling point of the composition changed by about 3° C. or less. The ternary mixtures shown in Table 3 were studied and the boiling point of the compositions changed by about 3° C. or less. The compositions exhibit azeotrope and/or azeotrope-like properties over this range.

TABLE 3

HFC-152a/CF₃I/HFO-1234 compositions at 14.42 psia

| Wt. % HFC-152a | Wt. % CF₃I | Wt. % HFO-1234 | Temperature (° C.) |
|---|---|---|---|
| 70.59 | 29.41 | 0.00 | −23.797 |
| 65.46 | 27.18 | 7.26 | −24.483 |
| 54.94 | 22.90 | 22.16 | −24.924 |
| 47.18 | 19.66 | 33.15 | −26.052 |
| 42.49 | 17.70 | 39.81 | −26.346 |
| 38.67 | 16.12 | 45.21 | −26.542 |
| 35.98 | 14.99 | 49.03 | −26.689 |
| 32.90 | 13.71 | 53.39 | −26.836 |
| 30.57 | 12.74 | 56.69 | −26.904 |
| 28.52 | 11.89 | 59.59 | −26.934 |
| 27.17 | 11.32 | 61.50 | −26.983 |
| 25.42 | 10.59 | 63.99 | −26.973 |

Example 4

An ebulliometer consisting of vacuum jacketed tube with a condenser on top which is further equipped with a Quartz Thermometer K96S4771 is used. About 15 g HFC-152a is charged to the ebulliometer and then $CF_3I$ is added in small, measured increments. Temperature depression is observed when $CF_3I$ is added to the HFC-152a, indicating a ternary minimum boiling azeotrope is formed. From greater than about 0 to about 65 weight percent HFO-1234, the boiling point of the composition changed by about 3° C. or less. The ternary mixtures shown in Table 4 were studied and the boiling point of the compositions changed by about 3° C. or less. The compositions exhibit azeotrope and/or azeotrope-like properties over this range.

TABLE 4

HFC-152a/CF₃I compositions at 14.42 psia

| Wt. % HFC-152a | Wt. % CF₃I | Temperature (° C.) |
|---|---|---|
| 100.00 | 0.00 | −23.363 |
| 97.11 | 2.89 | −23.923 |
| 75.10 | 24.90 | −25.810 |
| 64.98 | 35.02 | −26.613 |
| 54.72 | 45.28 | −26.969 |
| 47.99 | 52.01 | −27.160 |
| 45.44 | 54.56 | −27.208 |
| 40.67 | 59.33 | −27.305 |
| 36.20 | 63.80 | −27.276 |

What is claimed is:

1. An azeotrope-like composition comprising effective azeotrope-like amounts of HFC-152a, HFO-1234 and $CF_3I$.

2. The azeotrope-like composition of claim 1 which consists essentially of from about 10 to about 95 weight percent of HFC-152a, from about 1 to about 70 weight percent of $CF_3I$, and from greater than zero to about 70 weight percent of HFO-1234.

3. The azeotrope-like composition of claim 1 which consists essentially from 20 to about 95 weight percent of HFC-152a, from about 1 to about 65 weight percent of $CF_3I$, and from greater than zero to about 65 weight percent of HFO-1234.

4. The azeotrope-like composition of claim 1 which consists essentially from 20 to about 95 weight percent of HFC-152a, from about 1 to about 65 weight percent of $CF_3I$, and from greater than zero to about 25 weight percent of HFO-1234.

5. The azeotrope-like composition of claim 1 which consists essentially of from about 20 to about 40 weight percent of HFC-152a, from about 35 to about 65 weight percent of $CF_3I$, and from greater than zero to about 15 weight percent of HFO-1234.

6. The azeotrope-like composition of claim 1 having a boiling point of from about −23° C. to about −28° C. at a pressure of about 14.42 psia.

7. The azeotrope-like composition of claim 1 having a boiling point of from about −24° C. to about −27° C. at a pressure of about 14.42 psia.

8. The azeotrope-like composition of claim 1 having a boiling point of from about −24.5° C. to about −26.7° C. at a pressure of about 14.42 psia.

9. The composition of claim 1 further comprising an effective stabilizing amount of stabilizer.

10. The composition of claim 9 wherein said stabilizer comprises at least one phenol compound and at least one epoxide selected from the group consisting of aromatic epoxides, alkyl epoxides, alkenyl epoxides, and combinations of two or more thereof.

11. The composition of claim 1 further comprising a lubricant.

12. The composition of claim 11 wherein said lubricant is selected from the group consisting of mineral oil, alkyl benzenes, polyol esters, polyalkylene glycols, and combinations of two or more thereof.

13. A refrigerant composition comprising an azeotrope-like composition of claim 1.

14. The refrigerant composition of claim 13 further comprising a lubricant.

15. The refrigerant of claim 14 wherein said lubricant is selected from the group consisting of mineral oil, alkyl benzenes, polyol esters, PAG oil, and combinations of two or more thereof.

16. A refrigeration system comprising a refrigerant of claim 13.

17. A method for cooling an article which comprises condensing a refrigerant composition of claim 13 and thereafter evaporating said refrigerant composition in the vicinity of the article to be cooled.

18. A method for heating an article which comprises condensing a refrigerant composition of claim 13 in the vicinity of the article to be heated and thereafter evaporating said refrigerant composition.

19. A sprayable composition comprising a material to be sprayed and a propellant comprising an azeotrope-like composition of claim 1.

20. A sprayable composition according to claim 19 wherein the sprayable composition is an aerosol.

21. A blowing agent comprising an azeotrope-like composition of claim 1.

\* \* \* \* \*